United States Patent
Yang et al.

(10) Patent No.: US 10,645,600 B2
(45) Date of Patent: May 5, 2020

(54) CHANNEL DETECTION METHOD AND APPARATUS

(71) Applicant: ZTE CORPORATION, Shenzhen, Guangdong Province (CN)

(72) Inventors: Liu Yang, Shenzhen (CN); Bo Sun, Shenzhen (CN); Weimin Xing, Shenzhen (CN); Yonggang Fang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 91 days.

(21) Appl. No.: 15/554,704

(22) PCT Filed: Mar. 2, 2016

(86) PCT No.: PCT/CN2016/075345
§ 371 (c)(1),
(2) Date: Aug. 30, 2017

(87) PCT Pub. No.: WO2016/138861
PCT Pub. Date: Sep. 9, 2016

(65) Prior Publication Data
US 2018/0242176 A1   Aug. 23, 2018

(30) Foreign Application Priority Data

Mar. 5, 2015   (CN) .......................... 2015 1 0099108
Nov. 24, 2015  (CN) .......................... 2015 1 0821796

(51) Int. Cl.
*H04L 12/26*    (2006.01)
*H04W 24/08*    (2009.01)
(Continued)

(52) U.S. Cl.
CPC .......... *H04W 24/08* (2013.01); *H04B 17/318* (2015.01); *H04L 25/022* (2013.01);
(Continued)

(58) Field of Classification Search
CPC ..... H04W 24/08; H04W 24/10; H04W 88/08; H04W 24/02; H04W 88/02
See application file for complete search history.

(56) References Cited

U.S. PATENT DOCUMENTS

2008/0125160 A1* 5/2008 Zhu ........................ H04W 52/20
455/522
2014/0064101 A1* 3/2014 Hart .................. H04W 74/0808
370/241
(Continued)

FOREIGN PATENT DOCUMENTS

| CN | 101253784 A | 8/2008 |
|----|-------------|--------|
| CN | 104349327 A | 2/2015 |
| WO | WO2014209425 A1 | 12/2014 |

OTHER PUBLICATIONS

Imad Jamil, Orange, et al., OBSS reuse mechanism which preserves fairness, IEEE 802.11-14/1207rl, Sep. 15, 2014. XP68071031A.

*Primary Examiner* — Atique Ahmed
(74) *Attorney, Agent, or Firm* — Cantor Colburn LLP (57) ABSTRACT

Disclosed is a channel detection method applied to a wireless local area network device, including: measuring a channel before data are transmitted; and determining a Clear Channel Assessment (CCA) threshold according to a corresponding relation among a channel measurement result, transmitting power levels and channel access parameters, and judging whether a state of the channel is idle according to the CCA threshold. The present application further discloses a channel detection apparatus.

9 Claims, 3 Drawing Sheets

(51) Int. Cl.
*H04W 74/08* (2009.01)
*H04B 17/318* (2015.01)
*H04W 52/54* (2009.01)
*H04W 52/28* (2009.01)
*H04W 52/36* (2009.01)
*H04L 25/02* (2006.01)
*H04W 52/24* (2009.01)
*H04W 16/14* (2009.01)
*H04W 84/12* (2009.01)

(52) U.S. Cl.
CPC ....... *H04W 52/287* (2013.01); *H04W 52/367* (2013.01); *H04W 52/54* (2013.01); *H04W 74/0808* (2013.01); *H04W 16/14* (2013.01); *H04W 52/242* (2013.01); *H04W 84/12* (2013.01); *Y02D 70/14* (2018.01)

(56) References Cited

U.S. PATENT DOCUMENTS

| | | | | |
|---|---|---|---|---|
| 2014/0287769 A1* | 9/2014 | Taori | ......... | H04W 74/0808 |
| | | | | 455/450 |
| 2014/0376453 A1* | 12/2014 | Smith | ......... | H04W 74/0816 |
| | | | | 370/328 |
| 2015/0163824 A1* | 6/2015 | Krzymien | ......... | H04W 28/18 |
| | | | | 370/338 |
| 2015/0358904 A1* | 12/2015 | Kwon | ......... | H04W 52/0206 |
| | | | | 370/252 |
| 2016/0021661 A1* | 1/2016 | Yerramalli | ......... | H04W 16/14 |
| | | | | 370/329 |
| 2016/0050691 A1* | 2/2016 | Jauh | ......... | H04W 74/0808 |
| | | | | 370/252 |

* cited by examiner

CHANNEL DETECTION METHOD AND APPARATUS

TECHNICAL FIELD

The present application relates to but is not limited to the technical field of wireless communication, in particular to a channel detection method and apparatus.

BACKGROUND

At present, data communication using Wireless Local Area Networks (WLANs) has already been very popular and global demands for WLAN coverage ever increase. Industrial specification IEEE802.11 group of the Institute of Electrical and Electronics Engineers successively defines a series of standards such as 802.11a/b/g/n/ac to satisfy continuously increasing communication demands.

Figure 1:
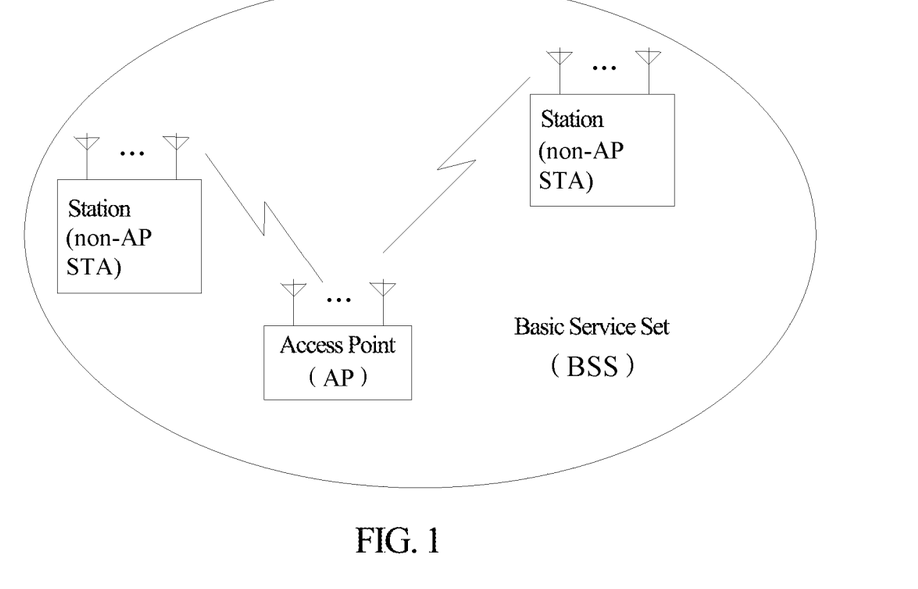
FIG. 1 illustrates a schematic diagram of a basic service set of a wireless local area network in the existing technology.

As illustrated in FIG. 1, in a common WLAN, an Access Point (AP) and a plurality of Stations (STA) associated with it may form a Basic Service Set (BSS). At present, 802.11 supports two methods for judging whether a channel is idle, i.e., physical carrier detection and virtual carrier detection, respectively. Physical carrier detection refers to a Clear Channel Assessment (CCA) channel detection technology, and an associated station judges whether a channel is busy or idle by detecting signal strength on a medium. On a basic bandwidth such as a 20 MHz channel, when it is judged that a received signal is an 802.11 signal and the strength is greater than −82 dBm, it is considered that this channel is busy. Virtual carrier detection refers to that, a third-party associated station except two parties of communication, when receiving a radio frame of which a receiving address is not an address of the third-party associated station itself, sets a local channel protection appointment time according to a transmission time indication in the frame. Transmission time in the frame may be a value of a local Network Allocation Vector (NAV) or a value of a BSS Response Indication Delay counter (BSS RID counter). When the value of the NAV or the value of the BSS RID counter is not zero, it is considered that the channel is busy and contention for transmission is not performed. Only when it is judged that the channel is idle through both physical carrier detection and virtual carrier detection, the associated station can perform contention for accessing to the channel for transmission.

Figure 2:
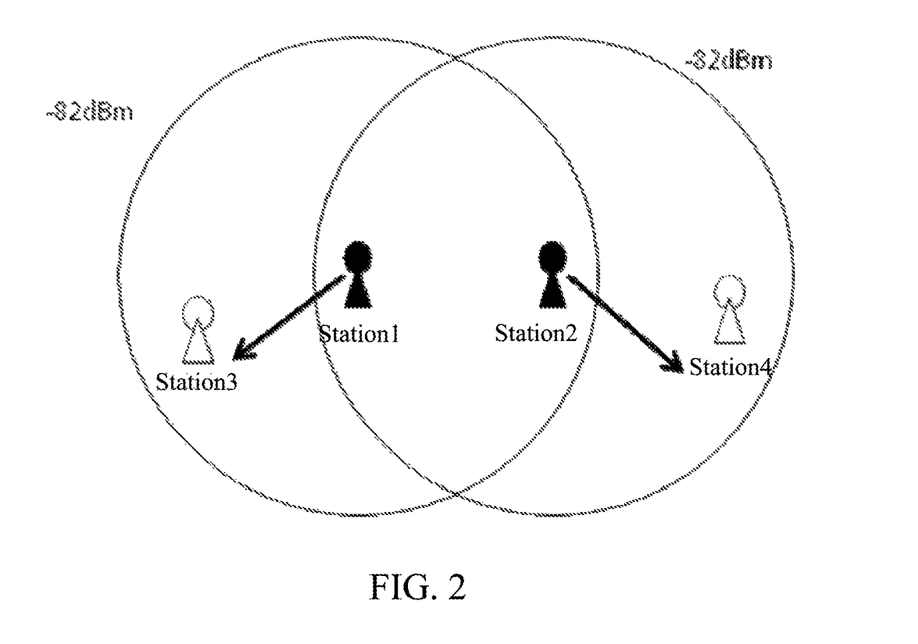
FIG. 2 illustrates a schematic diagram of dynamically configuring a CCA threshold in the existing technology.

The CCA channel detection technology always uses a fixed threshold as a standard for judging whether a channel is busy or idle, and this decreases access opportunities of the channel in certain scenarios. For example, as illustrated in FIG. 2, station 1 and station 2 are respectively two transmitting stations and can mutually hear signals each other, and a receiving power is greater than the CCA detection threshold (−82 dBm). When a fixed threshold is used for judging whether a channel is busy or idle and when station 1 transmits data to station 3, receiving strength of the signal which is transmitted to station 2 is greater than the CCA detection threshold (−82 dBm) of station 2, and thus station 2 judges that the channel is busy, keeps off and waits. Similarly, when station 2 transmits data to station 4, station 1 can only keep off and wait. Thereby, at each moment, only a pair of stations performs communication. However, in fact, the operation that station 1 transmits data to station 3 does not influence the operation that station 2 transmits data to station 4. Apparently, if the CCA detection threshold is too low and fixed, transmitting opportunities of transmitting stations are decreased and consequently the network utilization ratio is low.

Figure 3:
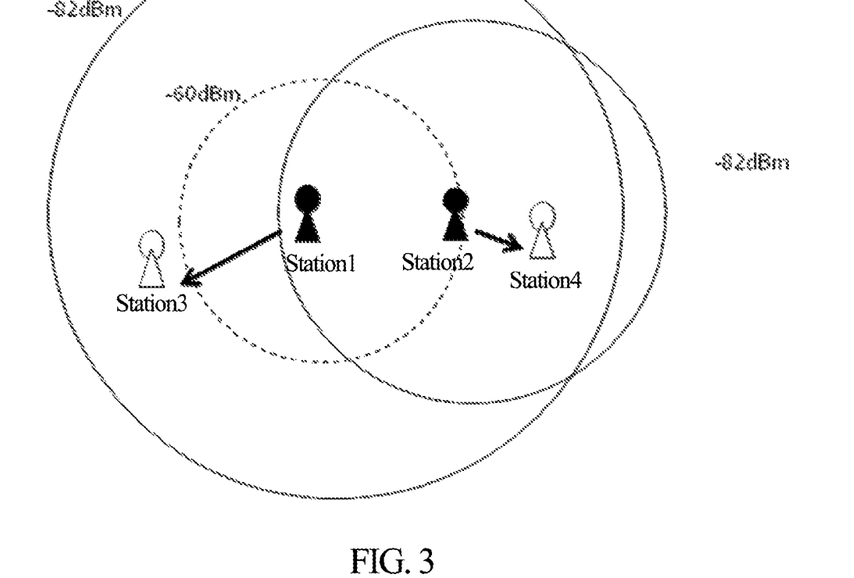
FIG. 3 illustrates a schematic diagram of interference and unfair contention caused by inequivalent transmitting power when a CCA threshold is dynamically configured in the existing technology.

Dynamic Sensitivity Control (DSC) technology can improve channel reusing ratio by dynamically and flexibly configuring the CCA threshold. For example, by properly increasing the CCA detection threshold at proper time, transmitting opportunities can be increased. However, in actual environments, transmitting powers of transmitting stations are different, inequivalent powers of transmitting stations will cause asymmetry of coverage ranges, consequently high-power devices will cause interferences with low-power devices when the CCA threshold is adjusted by using the DSC technology, or unfair contention will be caused. As illustrated in FIG. 3, station 1 and station 2 are transmitting stations and a transmitting power of station 2 is less than a transmitting power of station 1. When station 2 transmits data to station 4, a power of a signal which arrives at station 1 is slightly higher than −82 dBm. At this moment, since station 1 uses the DSC technology to increase the CCA threshold, station 1 judges that the channel is idle and thus the channel is reused to transmit data to station 3. Since the power of station 1 is too high, a serious interference is caused with receiving of station 4 (receiving data of station 2) in a transmission process, consequently the receiving of station 4 (receiving data of station 2) fails. This is the problem of interferences caused by the high-power devices. Similarly, during contention for the channel, station 1 monitors that signal strength of station 2 is low, the DSC technology may be used to increase the CCA threshold and the channel is reused to transmit data to station 3. However, station 2 monitors that signal strength of station 1 is high and exceeds the dynamic adjustment range of the CCA threshold, thus station 2 cannot multiplex the channel to transmit data. This is the problem of unfair contention caused by the high-power devices. No effective solution has already been provided to solve the problems of interference and unfair contention caused by inequivalent transmitting power.

SUMMARY

What is described below is a summary of the subject which is described in detail in this text. This summary is not used for limiting the protection scope of the claims.

Embodiments of the present disclosure provide a channel detection method and apparatus, which can improve the network utilization ratio, effectively reduce interferences caused by high-power devices at the same time and ensure the fairness of multiplex transmission.

The embodiment of the present disclosure provides a channel detection method, applied to a wireless local area network device, including:

measuring a channel before data are transmitted; and determining a Clear Channel Assessment (CCA) threshold according to a corresponding relation among a channel measurement result, transmitting power levels and channel access parameters, and judging whether a state of the channel is idle according to the CCA threshold.

In an exemplary embodiment, the step of determining a Clear Channel Assessment (CCA) threshold according to a corresponding relation among a channel measurement result, transmitting power levels and channel access parameters, and judging whether a state of the channel is idle according to the CCA threshold includes:

calculating a CCA threshold according to the channel access parameters and the channel measurement result; and judging whether the state of the channel is idle according to the CCA threshold.

In an exemplary embodiment, when it is judged that the state of the channel is busy according to the CCA threshold, the method further includes:

adjusting the transmitting power level which is expected to be used;

determining a corresponding channel access parameter according to the adjusted transmitting power level which is expected to be used;

recalculating a CCA threshold according to the channel access parameters and the channel measurement result; and judging whether the state of the channel is idle according to the recalculated CCA threshold.

In an exemplary embodiment, the step of determining a Clear Channel Assessment (CCA) threshold according to a corresponding relation among a channel measurement result, transmitting power levels and channel access parameters, and judging whether a state of the channel is idle according to the CCA threshold, includes:

selecting one or more groups of channel access parameters as candidate channel access parameters;

calculating a corresponding candidate CCA threshold for each group of candidate channel access parameters according to the candidate channel access parameters and the channel measurement result, and judging whether the state of the channel is idle according to the candidate CCA threshold;

screening all candidate channel access parameters to screen out candidate channel access parameters, under which the state of the channel is judged as idle, as final channel access parameters; and determining a transmitting power level corresponding to the channel according to the final channel access parameters.

In an exemplary embodiment, the channel access parameters include one or more of the following parameters: a receiving power upper limit of a radio frame transmitted by an access point, a CCA threshold margin, a CCA threshold lower limit and a parameter indicating a fixed CCA threshold.

In an exemplary embodiment, the channel measurement result includes: a receiving power of a signal which is being transmitted and is received on a channel on which a current device is to transmit data, and a receiving power of a radio frame received by the current device and transmitted by an access point.

In an exemplary embodiment, the step of calculating a CCA threshold according to the channel access parameters and the channel measurement result includes:

when a dynamic CCA threshold is used, determining a smaller one of the receiving power upper limit of the radio frame transmitted by the access point and the receiving power of the radio frame received by the current device and transmitted by the access point as an effective receiving power;

subtracting the CCA threshold margin from the effective receiving power to obtain a CCA threshold temporary value; and determining a greater one of the CCA threshold temporary value and the CCA threshold lower limit as a CCA threshold.

In an exemplary embodiment, a corresponding relation between transmitting power levels and channel access parameters includes that:

a transmitting power is divided into N numerical intervals and each numerical interval corresponds to a level;

the channel access parameter corresponding to a level at which transmitting power exceeds a threshold includes: a parameter indicating a fixed CCA threshold; and the channel access parameter corresponding to a level at which transmitting power does not exceed the threshold includes the following parameters: a receiving power upper limit of a radio frame transmitted by an access point corresponding to the transmitting power level, a CCA threshold margin corresponding to the transmitting power level, and a CCA threshold lower limit corresponding to the transmitting power level.

In an exemplary embodiment, the step of measuring a channel before data are transmitted includes: measuring a plurality of channels before data are transmitted;

the step of determining a Clear Channel Assessment (CCA) threshold according to a corresponding relation among a channel measurement result, transmitting power levels and channel access parameters, and judging whether a state of the channel is idle according to the CCA threshold, includes: for each channel, determining a CCA threshold corresponding to the channel according to a corresponding relation among a channel measurement result, transmitting power levels and channel access parameters, and judging whether the state of the channel is idle according to the CCA threshold; and the method further includes:

after the CCA threshold corresponding to each channel is determined, determining transmitting powers over channels.

In an exemplary embodiment, the step of determining a Clear Channel Assessment (CCA) threshold according to a corresponding relation among a channel measurement result, transmitting power levels and channel access parameters, and judging whether a state of the channel is idle according to the CCA threshold, includes:

determining a transmitting power and a CCA threshold of a current device for contending for a channel according to reusing parameters obtained by monitoring on the channel, strength of a signal which is being transmitted on the channel and a corresponding relation set by a system between power levels and CCA thresholds.

In an exemplary embodiment, the step of determining a transmitting power and a CCA threshold of a current device for contending for a channel according to reusing parameters obtained by monitoring on the channel, strength of a signal which is being transmitted on the channel and a corresponding relation set by a system between power levels and CCA thresholds includes:

monitoring a signal frame carrying reusing parameters on the channel, herein the reusing parameters include: an address of a receiver that occupies the channel, a transmitting power of the receiver and an interference threshold of the receiver;

determining a maximum transmitting power Pmax, at which no interference is caused with a receiver which has already occupied the channel after the current device reuses the channel, according to the reusing parameters obtained by monitoring; and selecting a candidate transmitting power level and a CCA threshold according to the determined maximum transmitting power Pmax of the current device, the corresponding relation set by a system between power levels and CCA thresholds and a receiving power of a signal which is being transmitted on the channel and is received by the current device, and if at least one group of candidate transmitting power levels which do not exceed the maximum transmitting power Pmax is capable of being selected and the CCA thresholds corresponding to the candidate transmitting power levels are capable of enabling the current device to judge that the state of the channel is idle, using the candidate transmitting power levels and the CCA thresholds as transmitting power levels and CCA thresholds of the current device for contending for the channel, and determining a transmitting power of the current device according to the transmitting power levels for contending for the channel.

In an exemplary embodiment, the step of determining a maximum transmitting power Pmax, at which no interference is caused with a receiver which has already occupied the channel after the current device reuses the channel, according to the reusing parameters obtained by monitoring includes:

determining a path loss L between the current device and a device of a receiver which has already occupied the channel; and determining maximum transmitting power Pmax, at which no interference is caused with the receiver which has already occupied the channel after the current device reuses the channel, according to the path loss L and an interference threshold I of the device of the receiver, where Pmax=I+L.

In an exemplary embodiment, the step of determining a path loss L between the current device and a device of a receiver which has already occupied the channel includes:

if the current device receives a transmission response frame used for confirming channel reusing transmission, clear to send (CTS) frame, transmitted by the device of the receiver which has already occupied the channel, determining a path loss L between the current device and the device of the receiver which has already occupied the channel according to a transmitting power Pt of the receiver acquired from reusing parameters of the CTS frame and a receiving power Pr at which the current device receives the CTS, where L=Pt−Pr.

In an exemplary embodiment, the step of determining a path loss L between the current device and a device of a receiver which has already occupied the channel includes:

if the current device receives a transmission request frame used for requesting channel reusing transmission, request to send (RTS) frame, transmitted by a device of a transmitting party which has already occupied the channel and does not receive a transmission response frame used for confirming channel reusing transmission, CTS frame, transmitted by the device of the receiver which has already occupied the channel, querying a path loss historical record of the current device, and if a historical record corresponding to the device of the receiver is queried, using a queried path loss historical value 1 as a path loss L between the current device and the device of the receiver which has already occupied the channel, herein the path loss value 1 in the path loss historical record is determined according to transmitting power Pt of another device and a receiving power Pr at which the current receives a signal frame when the current device receives the signal frame transmitted by the other device, where 1=Pt−Pr; and wherein the signal frame is a CTS frame or another data frame.

In an exemplary embodiment, the reusing parameters are carried in a physical layer frame header or a Media Access Control (MAC) layer frame header of a signal frame.

The embodiment of the present disclosure provides a channel detection apparatus, applied to a wireless local area network device, including:

a measurement module configured to measure a channel before data are transmitted; and a CCA threshold determination module configured to determine a CCA threshold according to a corresponding relation among a channel measurement result, transmitting power levels and channel access parameters, and judge whether a state of the channel is idle according to the CCA threshold.

In an exemplary embodiment, the CCA threshold determination module is configured to:

determine a corresponding channel access parameter according to a transmitting power level which is expected to be used;

calculate a CCA threshold according to the channel access parameters and the channel measurement result; and judge whether the state of the channel is idle according to the CCA threshold.

In an exemplary embodiment, the CCA threshold determination module is further configured to: when it is judged that the state of the channel is busy according to the CCA threshold, adjust the transmitting power level which is expected to be used; determine a corresponding channel access parameter according to the adjusted transmitting power level which is expected to be used; recalculate a CCA threshold according to the channel access parameters and the channel measurement result; and judge whether the state of the channel is idle according to the recalculated CCA threshold.

In an exemplary embodiment, the CCA threshold determination module is configured to:

select one or more groups of channel access parameters as candidate channel access parameters;

calculate a corresponding candidate CCA threshold for each group of candidate channel access parameters according to the candidate channel access parameters and the channel measurement result, and judge whether the state of the channel is idle according to the candidate CCA threshold;

screen all candidate channel access parameters to screen out candidate channel access parameters, under which the state of the channel is judged as idle, as final channel access parameters; and determine a transmitting power level corresponding the channel according to the final channel access parameters.

In an exemplary embodiment, the channel access parameters include one or more of the following parameters: a receiving power upper limit of a radio frame transmitted by an access point, a CCA threshold margin, a CCA threshold lower limit and a parameter indicating a fixed CCA threshold.

In an exemplary embodiment, the channel measurement result includes: a receiving power of a signal which is being transmitted and is received on a channel on which a current device is to transmit data, and a receiving power of a radio frame received by the current device and transmitted by an access point.

In an exemplary embodiment, the CCA threshold determination module calculates a CCA threshold according to the channel access parameters and the channel measurement result according to the following mode:

when a dynamic CCA threshold is used, determining a smaller one of the receiving power upper limit of the radio frame transmitted by the access point and the receiving power of the radio frame received by the current device and transmitted by the access point as an effective receiving power;

subtracting the CCA threshold margin from the effective receiving power to obtain a CCA threshold temporary value; and determining a greater one of the CCA threshold temporary value and the CCA threshold lower limit as a CCA threshold.

In an exemplary embodiment, a corresponding relation between transmitting power levels and channel access parameters includes that:

a transmitting power is divided into N numerical intervals and each numerical interval corresponds to a level;

the channel access parameter corresponding to a level at which transmitting power exceeds a threshold includes: a parameter indicating a fixed CCA threshold; and the channel access parameter corresponding to a level at which transmitting power does not exceed the threshold includes the following parameters: a receiving power upper limit of a radio frame transmitted by an access point corresponding to the transmitting power level, a CCA threshold margin corresponding to the transmitting power level, and a CCA threshold lower limit corresponding to the transmitting power level.

In an exemplary embodiment, the measurement module is configured to measure a plurality of channels before data are transmitted;

the CCA threshold determination module is configured to, for each channel, determine a CCA threshold corresponding to the channel according to a corresponding relation among a channel measurement result, transmitting power levels and channel access parameters, and judge whether the state of the channel is idle according to the CCA threshold; and the apparatus further includes:

a power allocation module configured to, after the CCA threshold corresponding to each channel is determined, determine transmitting powers over channels.

In an exemplary embodiment, the CCA threshold determination module is configured to:

determine a transmitting power and a CCA threshold of a current device for contending for a channel according to reusing parameters obtained by monitoring on the channel, strength of a signal which is being transmitted on the channel and a corresponding relation set by a system between power levels and CCA thresholds.

In an exemplary embodiment, the CCA threshold determination module is configured to:

monitor a signal frame carrying reusing parameters on the channel, herein the reusing parameters include: an address of a receiver that occupies the channel, a transmitting power of the receiver and an interference threshold of the receiver;

determine a maximum transmitting power Pmax, at which no interference is caused with a receiver which has already occupied the channel after the current device reuses the channel, according to the reusing parameters obtained by monitoring; and select a candidate transmitting power level and a CCA thresholds according to the determined maximum transmitting power Pmax of the current device, the corresponding relation set by a system between power levels and CCA thresholds and a receiving power of a signal which is being transmitted on the channel and is received by the current device, and if at least one group of candidate transmitting power levels which do not exceed the maximum transmitting power Pmax is capable of being selected and the CCA thresholds corresponding to the candidate transmitting power levels are capable of enabling the current device to judge that the state of the channel is idle, use the candidate transmitting power levels and the CCA thresholds as transmitting power levels and CCA thresholds of the current device for contending for the channel, and determine a transmitting power of the current device according to the transmitting power levels for contending for the channel.

In an exemplary embodiment, the CCA threshold determination module determines a maximum transmitting power Pmax, at which no interference is caused with a receiver which has already occupied the channel after the current device reuses the channel, according to the reusing parameters a obtained by monitoring according to the following mode:

determining a path loss L between the current device and a device of a receiver which has already occupied the channel; and determining maximum transmitting power Pmax, at which no interference is caused with the receiver which has already occupied the channel after the current device reuses the channel, according to the path loss L and an interference threshold I of the device of the receiver, where Pmax=I+L.

In an exemplary embodiment, the CCA threshold determination module determines a path loss L between the current device and a device of a receiver which has already occupied the channel according to the following mode:

if the current device receives a transmission response frame used for confirming channel reusing transmission, clear to send (CTS) frame, transmitted by the device of the receiver which has already occupied the channel, determining a path loss L between the current device and the device of the receiver which has already occupied the channel according to a transmitting power Pt of the receiver acquired from reusing parameters of the CTS frame and a receiving power Pr at which the current device receives the CTS, where L=Pt−Pr.

In an exemplary embodiment, the CCA threshold determination module determines a path loss L between the current device and a device of a receiver which has already occupied the channel according to the following mode:

if the current device receives a transmission request frame used for requesting channel reusing transmission, request to send (RTS) frame, transmitted by a device of a transmitting party which has already occupied the channel and does not receive a transmission response frame used for confirming channel reusing transmission, CTS frame, transmitted by the device of the receiver which has already occupied the channel, querying a path loss historical record of the current device, and if a historical record corresponding to the device of the receiver is queried, using a queried path loss historical value 1 as a path loss L between the current device and the device of the receiver which has already occupied the channel, herein the path loss value 1 in the path loss historical record is determined according to transmitting power Pt of another device and a receiving power Pr at which the current receives a signal frame when the current device receives the signal frame transmitted by the other device, where l=Pt−Pr; and herein the signal frame is a CTS frame or another data frame.

In an exemplary embodiment, the reusing parameters are carried in a physical layer frame header or a Media Access Control (MAC) layer frame header of a signal frame.

Besides, the embodiment of the present disclosure further provides a computer-readable storage medium, storing computer-executable instructions, which, when being executed, implement the channel detection method.

As compared with the existing technology, according to the channel detection method and apparatus provided by the embodiments of the present disclosure, the corresponding relation between transmitting power levels and channel access parameters is established. The device can determine the CCA threshold used by the current device for contending for the channel according to the receiving power of the received radio frame transmitted by the access point and the corresponding relation between transmitting power levels and channel access parameters. Alternatively, the device can determine the transmitting power and the CCA threshold used for contending for the channel according to the reusing parameters obtained by monitoring on the channel, the strength of the signal which is being transmitted on the channel and the corresponding relation set by a system between power levels and CCA thresholds, so as to improve the network utilization ratio, effectively reduce the interference caused by high-power devices at the same time and ensure the fairness of multiplex transmission.

After the drawings and the detailed description are read and understood, other aspects may be understood.

DETAILED DESCRIPTION

Embodiments of the present disclosure will be described below in detail with reference to the drawings. It needs to be stated that the embodiments in the present application and the features in the embodiments may be mutually and freely combined under a situation of no conflict.

Figure 4:
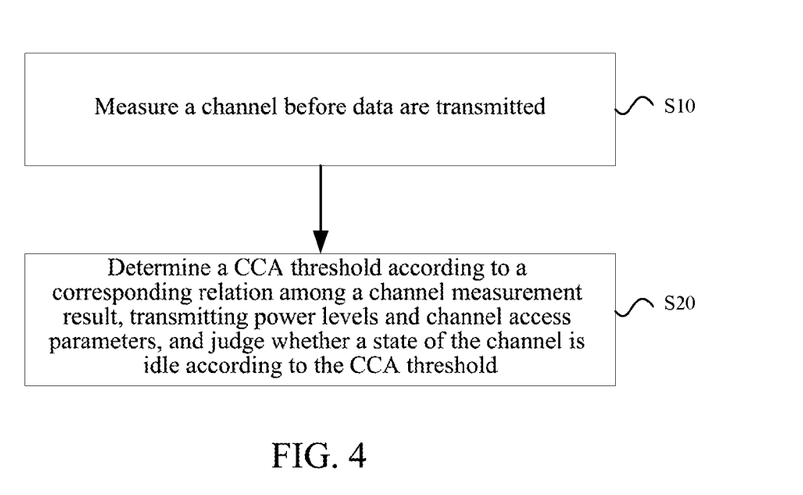
FIG. 4 illustrates a flowchart of a channel detection method according to an embodiment of the present disclosure.

As illustrated in FIG. 4, the embodiment of the present disclosure provides a channel detection method applied to a wireless local area network device, including the following steps S10 and S20.

In step S10, a channel is measured before data are transmitted.

In step S20, a Clear Channel Assessment (CCA) threshold is determined according to a corresponding relation among a channel measurement result, transmitting power levels and channel access parameters, and whether a state of the channel is idle is judged according to the CCA threshold.

Herein, the state of the channel includes that the channel is idle or the channel is busy.

Herein, the wireless local area network device is an Access Point (AP) or a station (STA).

Herein, the channel measurement result obtained through measurement performed on the channel before data are transmitted may include one or more of the following information:

a receiving power of a signal which is being transmitted and is received on a channel on which a current device is to transmit data, and a receiving power of a radio frame received by the current device and transmitted by an access point.

Herein, the radio frame may be a management frame, a control frame or other radio frames which are capable of being received by a station.

Herein, the management frame transmitted by the access point may be a Beacon frame transmitted by the access point.

Herein, the channel measurement result obtained through measurement performed on the channel before data are transmitted may further include one or more of the following information:

bandwidth occupied for transmission which is being performed on a channel on which a current device is to transmit data, information about a Basic Service Set (BSS) to which transmission which is being performed on the channel on which the current device is to transmit data belongs, a transmitting party address and/or receiver address of transmission which is being performed on the channel on which the current device is to transmit data, and a duration of transmission which is being performed on the channel on which the current device is to transmit data.

Herein, the step of determining a Clear Channel Assessment (CCA) threshold according to a corresponding relation among a channel measurement result, transmitting power levels and channel access parameters, and judging whether a state of the channel is idle according to the CCA threshold includes:

determining a corresponding channel access parameter according to a transmitting power level which is expected to be used;

calculating a CCA threshold according to the channel access parameters and the channel measurement result; and judging whether the state of the channel is idle according to the CCA threshold.

Herein, when it is judged that the state of the channel is busy according to the CCA threshold, the method further includes:

adjusting the transmitting power level which is expected to be used;

determining a corresponding channel access parameter according to the adjusted transmitting power level which is expected to be used;

recalculating a CCA threshold according to the channel access parameters and the channel measurement result; and judging whether the state of the channel is idle according to the recalculated CCA threshold.

Herein, the step of determining a Clear Channel Assessment (CCA) threshold according to a corresponding relation among a channel measurement result, transmitting power levels and channel access parameters, and judging whether a state of the channel is idle according to the CCA threshold includes:

selecting one or more groups of channel access parameters as candidate channel access parameters;

calculating a corresponding candidate CCA threshold for each group of candidate channel access parameters according to the candidate channel access parameters and the channel measurement result, and judging whether the state of the channel is idle according to the candidate CCA threshold;

screening all candidate channel access parameters to screen out candidate channel access parameters, under which the state of the channel is judged as idle, as final channel access parameters; and determining a transmitting power level corresponding to the channel according to the final channel access parameters.

Herein, a corresponding relation between transmitting power levels and channel access parameters is predefined or notified by a network to the device.

Herein, a step of the network notifying the corresponding relation between transmitting power levels and channel access parameters to the device includes:

an Access Point (AP) notifying the corresponding relation between transmitting power levels and channel access parameters to a station (STA) in a Basic Service Set (BSS) at which the current AP is located according to a broadcasting or unicasting mode.

Herein, the channel access parameters include one or more of the following parameters: a receiving power upper limit of a radio frame transmitted by an access point, a CCA threshold margin, a CCA threshold lower limit and a parameter indicating a fixed CCA threshold.

Herein, the channel access parameters may further include: transmitting bandwidth.

Herein, the step of calculating a CCA threshold according to the channel access parameters and the channel measurement result includes:

when a dynamic CCA threshold is used, determining a smaller one of the receiving power upper limit of the radio frame transmitted by the access point and the receiving power of the radio frame received by the current device and transmitted by the access point as an effective receiving power;

subtracting the CCA threshold margin from the effective receiving power to obtain a CCA threshold temporary value; and determining a greater one of the CCA threshold temporary value and the CCA threshold lower limit as a CCA threshold.

Herein, the corresponding relation between transmitting power levels and channel access parameters includes that:

transmitting power levels are divided into two levels, i.e., a high power level greater than a threshold and a low power level lower than the threshold;

the channel access parameter corresponding to the high power level includes: a parameter indicating a fixed CCA threshold; and the channel access parameter corresponding to the low power level includes the following parameters: a receiving power upper limit of a radio frame transmitted by an access point, a CCA threshold margin and a CCA threshold lower limit.

The corresponding relation between transmitting power levels (divided into two levels) and channel access parameters is as shown in Table 1, wherein the channel access parameter corresponding to the low power level includes the following parameters: a receiving power upper limit of a Beacon frame, a CCA threshold margin and a CCA threshold lower limit; and the channel access parameter corresponding to the high power level includes the following parameter: a parameter indicating a fixed CCA threshold.

TABLE 1

| Transmitting power level T | Channel access parameter set |
|---|---|
| T < 15 dBm | Upper limit: −40 dBm<br>Margin: 20 dB<br>Lower limit: −82 dBm |
| T ≥ 15 dBm | Fixed CCA threshold |

Herein, the corresponding relation between transmitting power levels and channel access parameters includes that:

a transmitting power is divided into N numerical intervals and each numerical interval corresponds to a level;

the channel access parameter corresponding to a level at which transmitting power exceeds a threshold includes: a parameter indicating a fixed CCA threshold value; and the channel access parameter corresponding to a level at which transmitting power does not exceed the threshold includes the following parameters: a receiving power upper limit of a radio frame transmitted by an access point corresponding to the transmitting power level, a CCA threshold margin corresponding to the transmitting power level, and a CCA threshold lower limit corresponding to the transmitting power level.

The corresponding relation between transmitting power levels (divided into four levels) and channel access parameters is as shown in Table 2. Herein, the channel access parameter corresponding to any one level except the highest transmitting power level includes the following parameters: a receiving power upper limit of a Beacon frame, a CCA threshold margin and a CCA threshold lower limit. The channel access parameter corresponding to the highest transmitting power level includes: a parameter indicating a fixed CCA threshold.

TABLE 2

| Transmitting power level T | Channel access parameter set |
|---|---|
| T ≤ 11 dBm | Upper limit: −35 dBm<br>Margin: 20 dB<br>Lower limit: −82 dBm |
| 11 dBm < T ≤ 15 dBm | Upper limit: −40 dBm<br>Margin: 25 dB<br>Lower limit: −82 dBm |
| 15 dBm < T ≤ 20 dBm | Upper limit: −40 dBm<br>Margin: 35 dB<br>Lower limit: −82 dBm |
| T > 20 dBm | Fixed CCA threshold |

The step of measuring a channel before data are transmitted includes: measuring a plurality of channels before data are transmitted.

The step of determining a CCA threshold according to a corresponding relation among a channel measurement result, transmitting power levels and channel access parameters, and judging whether a state of the channel is idle according to the CCA threshold includes: for each channel, determining a CCA threshold corresponding to the channel according to a corresponding relation among a channel measurement result, transmitting power levels and channel access parameters, and judging whether the state of the channel is idle according to the CCA threshold.

The method further includes:

after the CCA threshold corresponding to each channel is determined, determining transmitting powers over channels.

Herein, the step of determining a CCA threshold according to a corresponding relation among a channel measurement result, transmitting power levels and channel access parameters, and judging whether a state of the channel is idle according to the CCA threshold includes:

determining a transmitting power and a CCA threshold of a current device for contending for a channel according to reusing parameters obtained by monitoring on the channel, strength of a signal which is being transmitted on the channel and a corresponding relation set by a system between power levels and CCA thresholds.

Herein, the step of determining a transmitting power and a CCA threshold of a current device for contending for a channel according to reusing parameters obtained by monitoring on the channel, strength of a signal which is being transmitted on the channel and a corresponding relation set by a system between power levels and CCA thresholds includes:

monitoring a signal frame carrying reusing parameters on the channel, herein the reusing parameters include: an address of a receiver that occupies the channel, a transmitting power of the receiver and an interference threshold of the receiver;

determining a maximum transmitting power Pmax, at which no interference is caused with a receiver which has already occupied the channel after the current device reuses the channel, according to the reusing parameters obtained by monitoring; and selecting a candidate transmitting power level and CCA thresholds according to the determined maximum transmitting power Pmax of the current device, the corresponding relation set by a system between power levels and CCA thresholds and a receiving power of a signal which is being transmitted on the channel and is received by the current device, and if at least one group of candidate transmitting power levels which do not exceed the maximum transmitting power Pmax is capable of being selected and the CCA thresholds corresponding to the candidate transmitting power levels are capable of enabling the current device to judge that the state of the channel is idle, using the candidate transmitting power levels and the CCA thresholds as transmitting power levels and CCA thresholds of the current device for contending for the channel, and determining a transmitting power of the current device according to the transmitting power levels for contending for the channel.

Herein, the reusing parameters are carried in a physical layer frame header or a Media Access Control (MAC) layer frame header of a signal frame.

Herein, the step of determining a maximum transmitting power Pmax, at which no interference is caused with a receiver which has already occupied the channel after the current device reuses the channel, according to the reusing parameters obtained by monitoring includes:

determining a path loss L between the current device and a device of a receiver which has already occupied the channel; and determining maximum transmitting power Pmax, at which no interference is caused with the receiver which has already occupied the channel after the current device reuses the channel, according to the path loss L and an interference threshold I of the device of the receiver, where Pmax=I+L.

Herein, the step of determining a path loss L between the current device and a device of a receiver which has already occupied the channel includes:

if the current device receives a transmission response frame used for confirming channel reusing transmission, clear to send, CTS, frame transmitted by the device of the receiver which has already occupied the channel, determining a path loss L between the current device and the device of the receiver which has already occupied the channel according to a transmitting power Pt of the receiver acquired from reusing parameters of the CTS frame and a receiving power Pr at which the current device receives the CTS, where L=Pt−Pr.

Herein, the step of determining a path loss L between the current device and a device of a receiver which has already occupied the channel includes:

if the current device receives a transmission request frame used for requesting channel reusing transmission, request to send, RTS, frame transmitted by a device of a transmitting party which has already occupied the channel and does not receive a transmission response frame used for confirming channel reusing transmission, clear to send, CTS, frame transmitted by the device of the receiver which has already occupied the channel, querying a path loss historical record of the current device, and if a historical record corresponding to the device of the receiver is queried, using a queried path loss historical value 1 as a path loss L between the current device and the device of the receiver which has already occupied the channel.

Herein the path loss value 1 in the path loss historical record is determined according to a transmitting power Pt of another device and a receiving power Pr at which the current receives a signal frame when the current device receives the signal frame transmitted by the other device, where 1=Pt−Pr.

Herein the signal frame is a CTS frame or another data frame.

Figure 5:
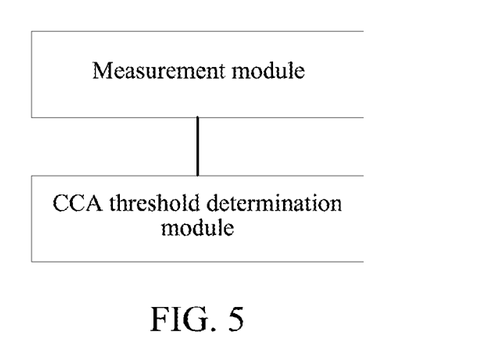
FIG. 5 illustrates a structural schematic diagram of a channel detection apparatus according to an embodiment of the present disclosure.

As illustrated in FIG. 5, the embodiment of the present disclosure provides a channel detection apparatus applied to a wireless local area network device, including a measurement module and a CCA threshold determination module.

The measurement module is configured to measure a channel before data are transmitted.

The CCA threshold determination module is configured to determine a (Clear Channel Assessment) CCA threshold according to a corresponding relation among a channel measurement result, transmitting power levels and channel access parameters, and judge whether a state of the channel is idle according to the CCA threshold.

Herein, the CCA threshold determination module is configured to:

determine a corresponding channel access parameter according to a transmitting power level which is expected to be used;

calculate a CCA threshold according to the channel access parameters and the channel measurement result; and judge whether the state of the channel is idle according to the CCA threshold.

Herein, the CCA threshold determination module is further configured to: when it is judged that the state of the channel is busy according to the CCA threshold, adjust the transmitting power level which is expected to be used; determine a corresponding channel access parameter according to the adjusted transmitting power level which is expected to be used; recalculate a CCA threshold according to the channel access parameters and the channel measurement result; and judge whether the state of the channel is idle according to the recalculated CCA threshold.

Herein, the CCA threshold determination module is configured to:

select one or more groups of channel access parameters as candidate channel access parameters;

calculate a corresponding candidate CCA thresholds for each group of candidate channel access parameters according to the candidate channel access parameters and the channel measurement result, and judge whether the state of the channel is idle according to the candidate CCA threshold;

screen all candidate channel access parameters to screen out candidate channel access parameters, under which the state of the channel is judged as idle, as final channel access parameters; and determine a transmitting power level corresponding the channel according to the final channel access parameters.

Herein, the channel access parameters include one or more of the following parameters: a receiving power upper limit of a radio frame transmitted by an access point, a CCA threshold margin, a CCA threshold lower limit and a parameter indicating a fixed CCA threshold.

Herein, the channel measurement result includes: a receiving power of a signal which is being transmitted and is received on a channel on which a current device is to transmit data, and a receiving power of a radio frame received by the current device and transmitted by an access point.

Herein, the CCA threshold determination module calculates a CCA threshold according to the channel access parameters and the channel measurement result according to the following mode:

when a dynamic CCA threshold is used, determining a smaller one of the receiving power upper limit of the radio frame transmitted by the access point and the receiving power of the radio frame received by the current device and transmitted by the access point as an effective receiving power;

subtracting the CCA threshold margin from the effective receiving power to obtain a CCA threshold temporary value; and determining a greater one of the CCA threshold temporary value and the CCA threshold lower limit as a CCA threshold.

Herein, the corresponding relation between transmitting power levels and channel access parameters includes that:

a transmitting power is divided into N numerical intervals and each numerical interval corresponds to a level;

the channel access parameter corresponding to a level at which transmitting power exceeds a threshold includes: a parameter indicating a fixed CCA threshold; and the channel access parameter corresponding to a level at which transmitting power does not exceed the threshold includes the following parameters: a receiving power upper limit of a radio frame transmitted by an access point corresponding to the transmitting power level, a CCA threshold margin corresponding to the transmitting power level, and a CCA threshold lower limit corresponding to the transmitting power level.

Herein, the measurement module is configured to measure a plurality of channels before data are transmitted.

The CCA threshold determination module is configured to, for each channel, determine a CCA threshold corresponding to the channel according to a corresponding relation among a channel measurement result, transmitting power levels and channel access parameters, and judge whether the state of the channel is idle according to the CCA threshold.

The apparatus further includes:

a power allocation module configured to, after the CCA threshold corresponding to each channel is determined, determine transmitting powers over channels.

Herein, the CCA threshold determination module is configured to: determine a transmitting power and a CCA threshold of a current device for contending for a channel according to reusing parameters obtained by monitoring on the channel, strength of a signal which is being transmitted on the channel and a corresponding relation set by a system between power levels and CCA thresholds.

Herein, the CCA threshold determination module is configured to:

monitor a signal frame carrying reusing parameters on the channel, herein the reusing parameters include: an address of a receiver that occupies the channel, a transmitting power of the receiver and an interference threshold of the receiver;

determine a maximum transmitting power Pmax, at which no interference is caused with a receiver which has already occupied the channel after the current device reuses the channel, according to the reusing parameters obtained by monitoring; and select a candidate transmitting power level and a CCA threshold according to the determined maximum transmitting power Pmax of the current device, the corresponding relation set by a system between power levels and CCA thresholds and a receiving power of a signal which is being transmitted on the channel and is received by the current device, and if at least one group of candidate transmitting power levels which do not exceed the maximum transmitting power Pmax is capable of being selected and the CCA thresholds corresponding to the candidate transmitting power levels are capable of enabling the current device to judge that the state of the channel is idle, use the candidate transmitting power levels and the CCA thresholds as transmitting power levels and CCA thresholds of the current device for contending for the channel, and determine a transmitting power of the current device according to the transmitting power levels for contending for the channel.

Herein, the reusing parameters are carried in a physical layer frame header or a Media Access Control (MAC) layer frame header of a signal frame.

Herein, the CCA threshold determination module determines a maximum transmitting power Pmax, at which no interference is caused with a receiver which has already occupied the channel after the current device reuses the channel, according to the reusing parameters obtained by monitoring according to the following mode:

determining a path loss L between the current device and a device of a receiver which has already occupied the channel; and determining maximum transmitting power Pmax, at which no interference is caused with the receiver which has already occupied the channel after the current device reuses the channel, according to the path loss L and an interference threshold I of the device of the receiver, where Pmax=I+L.

Herein, the CCA threshold determination module determines a path loss L between the current device and a device of a receiver which has already occupied the channel according to the following mode:

if the current device receives a transmission response frame used for confirming channel reusing transmission, clear to send, CTS, frame transmitted by the device of the receiver which has already occupied the channel, determining a path loss L between the current device and the device of the receiver which has already occupied the channel according to a transmitting power Pt of the receiver acquired from reusing parameters of the CTS frame and a receiving power Pr at which the current device receives the CTS, where L=Pt−Pr.

Herein, the CCA threshold determination module determines a path loss L between the current device and a device of a receiver which has already occupied the channel according to the following mode:

if the current device receives a transmission request frame used for requesting channel reusing transmission, request to send, RTS, frame transmitted by a device of a transmitting party which has already occupied the channel and does not receive a transmission response frame used for confirming channel reusing transmission, clear to send, CTS, frame transmitted by the device of the receiver which has already occupied the channel, querying a path loss historical record of the current device, and if a historical record corresponding to the device of the receiver is queried, using a queried path loss historical value 1 as a path loss L between the current device and the device of the receiver which has already occupied the channel.

Herein the path loss value 1 in the path loss historical record is determined according to a transmitting power Pt of another device and a receiving power Pr at which the current receives a signal frame when the current device receives the signal frame transmitted by the other device, where 1=Pt−Pr.

Herein the signal frame is a CTS frame or another data frame.

The solutions provided by the embodiments of the present disclosure will be described below through specific application examples.

There are certain differences in transmitting powers of common terminal devices of wireless local area networks. For example, a transmitting power of a mobile phone is generally less than 11 dBm; a transmitting power of a tablet computer is about 11 dBm-14 dBm; a transmitting power of a VoIP (Voice over Internet Protocol) terminal is about 11 dBm-16 dBm; and a transmitting power of a notebook computer is about 17 dBm-20 dBm.

EXAMPLE 1

This example mainly describes a method for corresponding transmitting power levels to channel access parameters, and a process that a station finds a corresponding channel access parameter set according to a transmitting power level, calculates a CCA threshold by using the channel access parameter set and contends for a channel.

In this example, by taking 15 dBm as a boundary, a device with a transmitting power greater than or equal to 15 dBm will use a fixed CCA threshold of −82 dBm; a device with a transmitting power less than 15 dBm corresponds to a channel access parameter set, i.e., a small-power device may dynamically adjust a CCA threshold according to the channel access parameter set and a channel detection result.

A corresponding relation between transmitting power levels and channel access parameter sets is as shown in Table 1 above.

For example, station A is a notebook computer device and a transmitting power is 17 dBm. Station A receives a corresponding relation between transmitting power levels and channel access parameters shown in Table 1 above in a Beacon frame broadcasted by AP. According to the corresponding relation, station A is a high-power device and should use a fixed value as a CCA threshold, i.e., −82 dBm as a CCA threshold.

For example, station B is a smart phone device and the transmitting power is 11 dBm. Station B receives a corresponding relation between transmitting power levels and channel access parameters shown in Table 1 above in a Beacon frame broadcasted by AP. According to the corresponding relation, station B is a low-power device and may use a dynamic CCA threshold technology, and corresponding channel access parameters are: upper limit: −40 dBm, margin: 20 dB, lower limit: −82 dBm. Station B may dynamically calculate a CCA threshold according to parameters specified in the channel access parameter meter and a channel detection result.

Supposing that Received Signal Strength (RSS) of a Beacon frame received by station B is −30 dBm, a calculation process is as follow.

Firstly, an effective receiving power effR is calculated:

effR=MIN(RSS,Upper limit)=MIN(−30 dBm,−40 dBm)=−40 dBm.

In other words, a smaller one of a receiving power upper limit of the Beacon frame and a receiving power RSS of the Beacon frame received by the current device is determined as the effective receiving power effR.

Then, a CCA threshold temporary value CCAt is calculated:

CCAt=effR−Margin=−40 dBm−20 dB=−60 dBm.

In other words, the CCA threshold temporary value is obtained by subtracting the CCA threshold margin from the effective receiving power effR.

Thus, a finally used CCA threshold CCAT is:

CCAT=MAX(CCAt,Lower limit)=MAX(−60 dBm,−82 dBm)=−60 dBm.

In other words, a greater one of the CCA threshold temporary value and the CCA threshold lower limit is determined as the CCA threshold.

Then, when station B has data which are to be transmitted, −60 dBm is used as a CCA threshold for contending for accessing to a channel.

EXAMPLE 2

This example mainly describes another method for corresponding transmitting power levels to channel access parameter sets, and a process that a station finds a corresponding channel access parameter set according to a transmitting power level, calculates a CCA threshold by using the channel access parameter set and contends for a channel.

In this example, transmitting power is divided into four levels and each transmitting power level corresponds to a different channel access parameter set. A corresponding relation is as shown in Table 2 above.

For example, station A is a tablet computer device and transmitting power is 13 dBm. When station A is associated with AP, station A receives an association response frame of AP, which indicates a corresponding relation between transmitting power levels and channel access parameter sets shown in Table 2 above. According to the corresponding relation, station B uses the following parameters: upper limit: −40 dBm, margin: 25 dB, lower limit: −82 dBm.

Supposing that RSS of a Beacon frame received by station A is −35 dBm, a method for calculating a CCA threshold in example 1 is used to calculate a CCA threshold to be −65 dBm.

EXAMPLE 3

This example mainly describes a process that a power-adjustable station selects a proper transmitting power to transmit data.

In this example, a used corresponding relation between transmitting power levels and channel access parameter sets is as shown in Table 2 above.

For example, station A is a power-adjustable notebook computer device and a transmitting power range is 13-20 dBm. When station A is associated, station A receives an association response frame of AP, which indicates a corresponding relation between transmitting power levels and channel access parameters shown in Table 2 above. According to the corresponding relation, station A may use two parameter sets, i.e., parameter set 1 including the following access parameters corresponding to transmitting power T in a range which is greater than 11 dBm and less than or equal to 15 dBm: upper limit: −40 dBm, margin: 25 dB, lower limit: −82 dBm; and parameter set 2 including the following access parameters corresponding to transmitting power T in a range which is greater than 15 dBm and less than or equal to 20 dBm: upper limit: −40 dBm, margin: 35 dB, lower limit: −82 dBm.

Supposing that RSS of a Beacon frame received by station A is −45 dBm, a CCA threshold is dynamically calculated as follows:

when parameter set 1 is used, a method for calculating a CCA threshold in example 1 is used to calculate a CCA threshold to be −70 dBm; and when parameter set 2 is used, a method for calculating a CCA threshold in example 1 is used to calculate a CCA threshold to be −80 dBm.

It is supposed that station A monitors that a channel is occupied by other stations and signal strength of a signal arriving at station A is −77 dBm. If −80 dBm is used as a CCA detection threshold, since the signal receiving power obtained by monitoring is greater than the CCA detection threshold, station A judges that the channel is busy, keeps off and waits. If station A selects −70 dBm as the CCA detection threshold, since the signal receiving power obtained by monitoring is less than CCA detection threshold, station A judges that the channel is idle and may contend for the channel, and according to the corresponding relation between transmitting power levels and channel access parameter sets, the transmitting power of station A should be not higher than 15 dBm. In order to guarantee that a receiver correctly receives data, station A finally selects power of 15 dBm for transmitting data.

EXAMPLE 4

This example mainly describes a process that a station transmits data on different channels by using different transmitting power levels.

In this example, a used corresponding relation between transmitting power levels and channel access parameter sets is as shown in Table 2 above.

For example, station A is a notebook computer device and a transmitting power range is 13-20 dBm.

According to the corresponding relation, station A may use two parameter sets, i.e., parameter set 1 including the following access parameters corresponding to transmitting power T in a range which is greater than 11 dBm and less than or equal to 15 dBm: upper limit: −40 dBm, margin: 25 dB, lower limit: −82 dBm; and parameter set 2 including the following access parameters corresponding to transmitting power T in a range which is greater than 15 dBm and less than or equal to 20 dBm: upper limit: −40 dBm, margin: 35 dB, lower limit: −82 dBm.

Supposing that RSS of a Beacon frame received by station A is −45 dBm, a CCA threshold is dynamically calculated as follows:

when parameter set 1 is used, a method for calculating a CCA threshold in example 1 is used to calculate a CCA threshold to be −68 dBm; and when parameter set 2 is used, a method for calculating a CCA threshold in example 1 is used to calculate a CCA threshold to be −78 dBm.

Figure 6:
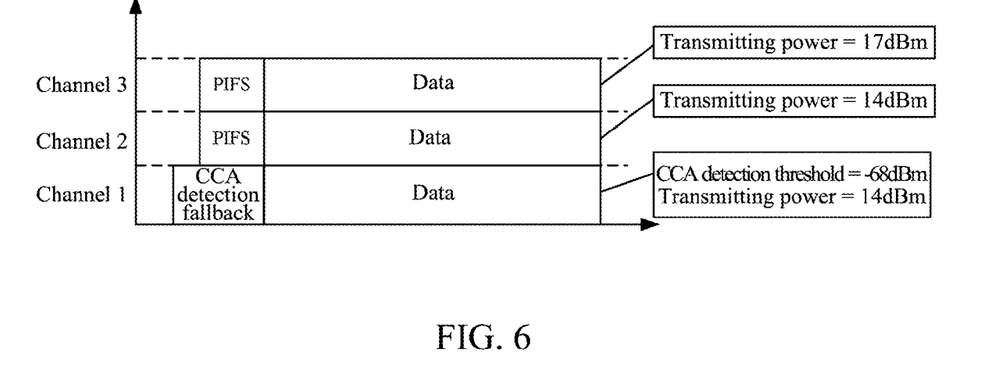
FIG. 6 illustrates a schematic diagram of transmitting data by using different transmitting powers on different channels in application example 4 of the present disclosure.

Supposing that station A has data to be transmitted and monitors an interference signal with strength of −70 dBm on channel 1, if station A selects −68 dBm as a threshold, station A judges that the channel is idle and contends for accessing to the channel. And according to the corresponding relation between transmitting power levels and channel access parameter sets, station A uses 14 dBm as the transmitting power on channel 1.

Within a period of timeslot before transmission, such as within a time length of a PIFS (Point Inter-Frame Space), supposing that station A detects that channels 2, 3 are idle, station A performs power allocation, and may transmit data on channel 2 by using a transmitting power of 14 dBm and transmit data on channel 3 by using a transmitting power of 17 dBm after setting aside a transmitting power of 14 dBm on channel 1 from the maximum transmitting power of 20 dBm.

A relation of power allocation simultaneously performed by station A on three channels is as shown in FIG. 6.

EXAMPLE 5

This example mainly describes another method for corresponding transmitting power levels to channel access parameter sets, and a process that a station finds a corresponding channel access parameter set according to a transmitting power level, calculates a CCA threshold by using the channel access parameter set and contends for a channel.

In this example, a transmitting power is divided into four levels, and for each transmitting power level, a maximum transmitting power which is capable of being used and a corresponding channel access parameter set are specified. A corresponding relation is as shown in Table 3 below:

TABLE 3

| Transmitting power level T | Channel access parameter set |
| --- | --- |
| T ≤ 11 dBm | Upper limit: −35 dBm |
|  | Margin: 20 dB |
|  | Lower limit: −82 dBm |
| T ≤ 15 dBm | Upper limit: −40 dBm |
|  | Margin: 25 dB |
|  | Lower limit: −82 dBm |
| T ≤ 20 dBm | Upper limit: −40 dBm |
|  | Margin: 35 dB |
|  | Lower limit: −82 dBm |
| T > 20 dBm | Fixed CCA threshold |

For example, station A is a power-adjustable tablet computer device and a transmitting power range is 13-20 dBm. When station A is associated, station A receives an association response frame of AP, which indicates a corresponding relation between transmitting power levels and channel access parameter sets shown in Table 3 above. According to the corresponding relation, station A may use two parameter sets, i.e., parameter set 1 including the following access parameters corresponding to transmitting power T in a range which is less than or equal to 15 dBm: upper limit: −40 dBm, margin: 25 dB, lower limit: −82 dBm; and parameter set 2 including the following access parameters corresponding to transmitting power T in a range which is less than or equal to 20 dBm: upper limit: −40 dBm, margin: 35 dB, lower limit: −82 dBm.

Supposing that RSS of a Beacon frame received by station A is −40 dBm, a CCA threshold is dynamically calculated as follows:

when parameter set 1 is used, a method for calculating a CCA threshold in example 1 is used to calculate a CCA threshold to be −65 dBm; and when parameter set 2 is used, a method for calculating a CCA threshold in example 1 is used to calculate a CCA threshold to be −75 dBm.

It is supposed that station A monitors that a channel is occupied by other stations and signal strength of a signal arriving at station A is −77 dBm. Station A judges that the channel is idle when two CCA thresholds are used. According to the corresponding relation between transmitting power levels and channel access parameter sets, it is acceptable as long as transmitting power of station A is not higher than 20 dBm. In order to not cause great interferences with other devices, station A selects a transmitting power of 13 dBm for transmitting data.

EXAMPLE 6

This example mainly describes a process that a station contending for a channel estimates an influence of multiplex transmission of the current station on current transmission according to reusing parameters carried by a signal which is being transmitted on the channel and determines a transmitting power and a CCA threshold according to the influence.

For example, station A is a power-adjustable notebook computer device and a transmitting power range is 13-20 dBm. When station A is associated, station A receives an association response of AP, which carries a corresponding relation between transmitting power levels and reference CCA thresholds. The corresponding relation between transmitting power levels and reference CCA thresholds may also be predefined by a system.

Table 4 below is an example of the corresponding relation between transmitting power levels and reference CCA thresholds of the station.

TABLE 4

| Transmitting power level T | Reference CCA threshold |
|---|---|
| T ≤ 11 dBm | −62 dBm |
| 11 < T ≤ 15 dBm | −70 dBm |
| 15 < T ≤ 20 dBm | −75 dBm |
| T > 20 dBm | −82 dBm |

Station A monitors a channel and successively receives a transmission request frame, Request To Send (RTS) frame, transmitted by station B to station C and a transmission confirmation frame, Clear To Send (CTS) frame, returned by station C to station B; or station A only receives one of RTS and CTS. By parsing the RTS and/or CTS frame, station A learns about that station B will transmit data to station C within a time appointed through RTS/CTS. Station A tries to multiplex this period of time to transmit data to station D.

Station A extracts reusing parameters from a physical layer frame header or an MAC (Media Access Control) layer frame header of the RTS and/or CTS frame. And the reusing parameters contain information such as an address of a transmitter (address of station B) of a signal to be transmitted, an address of a receiver (address of station C), a transmitting power of the transmitter (transmitting power Pb of station B), a transmitting power of the receiver (transmitting power Pc of station C) and an interference threshold of the receiver (interference threshold I of station C).

Then, station A estimates a path loss L from station A to station C according to the transmitting power Pc of station C and the receiving power Rc of the CTS frame received by station A and transmitted by station C, where L=Pc-Rc. Then, in combination with the interference threshold I of station C, station A determines the maximum transmitting power Pmax, at which no interference is caused with the receiver (station C) which is receiving data after the current device reuses the channel, where Pmax=I+L.

If station A does not receive the CTS frame transmitted by station C, station A may query a path loss record between the current device and other device. If the record of station C is queried, the maximum transmitting power Pmax, at which no interference is caused with the receiver (station C) which is receiving data after the current device reuses the channel, is determined according to the queried path loss L and the interference threshold I of station C, where Pmax=I+L.

The station may calculate the path loss between the current device and the other device when a signal frame transmitted by the other device is received, and generate a record for saving; and the path loss is a difference obtained by subtracting the receiving power at which the current device receives the signal frame from the transmitting power of the other device.

The signal frame is a CTS frame or another data frame.

For example, if the path loss L between station A and station C is 85 dBm and the interference threshold I of station C is −67 dBm, the maximum transmitting power Pmax of station A may be calculated, i.e., Pmax=85+(−67)=18 dBm.

The corresponding relation between transmitting power levels and reference CCA thresholds of the station is queried according to the maximum transmitting power of station A. After Table 4 above is queried, since the transmitting power range of station A is 13-20 dBm, the transmitting power T which may be selected by station A is within a range of 11<T≤15 dBm or 15<T≤20 dBm.

If the transmitting power T selected by station A is within 11<T≤15 dBm, the reference CCA threshold corresponding to the transmitting power level is −70 dBm. Supposing that the signal strength of the signal which is being transmitted at current and arrives at station A is −73 dBm, it is judged that the current channel is idle.

If the transmitting power T selected by station A is within 15<T≤20 dBm, the reference CCA threshold corresponding to the transmitting power level is −75 dBm. Supposing that the signal strength of the signal which is being transmitted at current and arrives at station A is −73 dBm, it is judged that the current channel is busy.

Therefore, station A selects a CCA threshold which facilitates the current station to contend for the channel, i.e., the final CCA threshold determined by station A can enable station A to judge that the current channel is idle, i.e., station A selects the CCA threshold which is −70 dBm. At this moment, the transmitting power level corresponding to station A is 11<T≤15 dBm, e.g., station A finally selects a transmitting power of 15 dBm for contending for accessing to the channel.

According to the channel detection method and apparatus provided by the embodiments, the corresponding relation between transmitting power levels and channel access parameters is established. The device can determine the CCA threshold used by the current device for contending for the channel according to the receiving power of the received radio frame transmitted by the access point and the corresponding relation between transmitting power levels and channel access parameters. Alternatively, the device can determine the transmitting power and the CCA threshold used for contending for the channel according to the reusing parameters obtained by monitoring on the channel, the strength of the signal which is being transmitted on the channel and the corresponding relation set by a system between power levels and CCA thresholds, so as to improve the network utilization ratio, effectively reduce the interference caused by high-power devices at the same time and ensure the fairness of multiplex transmission.

Besides, the embodiment of the present disclosure further provides a computer-readable storage medium, storing computer-executable instructions, which, when being executed, implement the channel detection method.

One skilled in the art can understand that all or partial steps in the above-mentioned methods may be completed by relevant hardware instructed by a program, and the program may be stored in a computer-readable storage medium such as a read-only memory, a magnetic disc or a compact disc. Optionally, all or partial steps in the above-mentioned embodiments may also be implemented by using one or more integrated circuits. Correspondingly, each module/unit in the above-mentioned embodiments may be implemented by means of hardware and may also be implemented by means of a software function module. The present application is not limited to a combination of hardware and software in any specific form.

It needs to be stated that the present application may further have various other embodiments. One skilled in the art may make various corresponding modifications and variations according to the present application without departing from the rule and essence of the present application. However, these corresponding modifications and variations shall be all included in the protection scope of the appended claims of the present application.

INDUSTRIAL APPLICABILITY

By using the channel detection method and apparatus provided by the embodiments of the present disclosure, the network utilization ratio is improved, the interferences caused by high-power devices are effectively reduced at the same time and the fairness of multiplex transmission is ensured.

What we claim is:

1. A channel detection method, applied to a wireless local area network device, comprising:
    measuring a channel before data are transmitted; and
    determining a Clear Channel Assessment (CCA) threshold according to a corresponding relation among a channel measurement result, transmitting power levels and channel access parameters, and judging whether a state of the channel is idle according to the CCA threshold,
    wherein the step of determining a Clear Channel Assessment (CCA) threshold according to a corresponding relation among a channel measurement result, transmitting power levels and channel access parameters, and judging whether a state of the channel is idle according to the CCA threshold, comprises: calculating a CCA threshold according to the channel access parameters and the channel measurement result; and judging whether the state of the channel is idle according to the CCA threshold,
    wherein the channel access parameters comprise one or more of the following parameters: a receiving power upper limit of a radio frame transmitted by an access point, a CCA threshold margin, a CCA threshold lower limit and a parameter indicating a fixed CCA threshold;
    the channel measurement result comprises: a receiving power of a signal which is being transmitted and is received on a channel on which a current device is to transmit data, and a receiving power of a radio frame received by the current device and transmitted by an access point,
    wherein the step of calculating a CCA threshold according to the channel access parameters and the channel measurement result comprises:
    when a dynamic CCA threshold is used, determining a smaller one of the receiving power upper limit of the radio frame transmitted by the access point and the receiving power of the radio frame received by the current device and transmitted by the access point as an effective receiving power;
    subtracting the CCA threshold margin from the effective receiving power to obtain a CCA threshold temporary value; and
    determining a greater one of the CCA threshold temporary value and the CCA threshold lower limit as a CCA threshold.

2. The method according to claim 1, wherein
    when it is judged that the state of the channel is busy according to the CCA threshold, the method further comprises:
    adjusting the transmitting power level which is expected to be used;
    determining a corresponding channel access parameter according to the adjusted transmitting power level which is expected to be used;
    recalculating a CCA threshold according to the channel access parameters and the channel measurement result; and
    judging whether the state of the channel is idle according to the recalculated CCA threshold,
    or,
    wherein the step of determining a Clear Channel Assessment CCA threshold according to a corresponding relation among a channel measurement result, transmitting power levels and channel access parameters, and judging whether a state of the channel is idle according to the CCA threshold, comprises:
    selecting one or more groups of channel access parameters as candidate channel access parameters;
    calculating a corresponding candidate CCA threshold for each group of candidate channel access parameters according to the candidate channel access parameters and the channel measurement result, and judging whether the state of the channel is idle according to the candidate CCA threshold;
    screening all candidate channel access parameters to screen out candidate channel access parameters, under which the state of the channel is judged as idle, as final channel access parameters; and
    determining a transmitting power level corresponding to the channel according to the final channel access parameters.

3. The method according to claim 1, wherein a corresponding relation between transmitting power levels and channel access parameters comprises that:
    a transmitting power is divided into N transmitting power levels;
    the channel access parameter corresponding to a level at which transmitting power exceeds a threshold comprises: a parameter indicating a fixed CCA threshold; and
    the channel access parameter corresponding to a level at which transmitting power does not exceed the threshold comprises the following parameters: a receiving power upper limit of a radio frame transmitted by an access point corresponding to the transmitting power level, a CCA threshold margin corresponding to the transmitting power level, and a CCA threshold lower limit corresponding to the transmitting power level.

4. The method according to claim 2, wherein,
the step of measuring a channel before data are transmitted comprises: measuring a plurality of channels before data are transmitted;
the step of determining a Clear Channel Assessment CCA threshold according to a corresponding relation among a channel measurement result, transmitting power levels and channel access parameters, and judging whether a state of the channel is idle according to the CCA threshold, comprises: for each channel, determining a CCA threshold corresponding to the channel according to a corresponding relation among a channel measurement result, transmitting power levels and channel access parameters, and judging whether the state of the channel is idle according to the CCA threshold; and
the method further comprises:
after the CCA threshold corresponding to each channel is determined, determining transmitting powers over channels.

5. A computer-readable storage medium, storing computer-executable instructions, which, when being executed, implement the channel detection method according to claim 1.

6. A channel detection apparatus, applied to a wireless local area network device, comprising a processor and a memory, wherein the memory stores processor-executable programs, and the programs comprise:
a measurement module configured to measure a channel before data are transmitted; and
a Clear Channel Assessment (CCA) threshold determination module configured to determine a CCA threshold according to a corresponding relation among a channel measurement result, transmitting power levels and channel access parameters, and judge whether a state of the channel is idle according to the CCA threshold,
wherein the CCA threshold determination module is further configured to:
calculate a CCA threshold according to the channel access parameters and the channel measurement result; and
judge whether the state of the channel is idle according to the CCA threshold,
wherein the channel access parameters comprise one or more of the following parameters: a receiving power upper limit of a radio frame transmitted by an access point, a CCA threshold margin, a CCA threshold lower limit and a parameter indicating a fixed CCA threshold;
the channel measurement result comprises: a receiving power of a signal which is being transmitted and is received on a channel on which a current device is to transmit data, and a receiving power of a radio frame received by the current device and transmitted by an access point,
wherein the CCA threshold determination module calculates a CCA threshold according to the channel access parameters and the channel measurement result according to the following mode:
when a dynamic CCA threshold is used, determining a smaller one of the receiving power upper limit of the radio frame transmitted by the access point and the receiving power of the radio frame received by the current device and transmitted by the access point as an effective receiving power;
subtracting the CCA threshold margin from the effective receiving power to obtain a CCA threshold temporary value; and
determining a greater one of the CCA threshold temporary value and the CCA threshold lower limit as a CCA threshold.

7. The apparatus according to claim 6, wherein
the CCA threshold determination module is further configured to: when it is judged that the state of the channel is busy according to the CCA threshold, adjust the transmitting power level which is expected to be used; determine a corresponding channel access parameter according to the adjusted transmitting power level which is expected to be used; recalculate a CCA threshold according to the channel access parameters and the channel measurement result; and judge whether the state of the channel is idle according to the recalculated CCA threshold,
or,
wherein the CCA threshold determination module is configured to:
select one or more groups of channel access parameters as candidate channel access parameters;
calculate a corresponding candidate CCA threshold for each group of candidate channel access parameters according to the candidate channel access parameters and the channel measurement result, and judge whether the state of the channel is idle according to the candidate CCA threshold;
screen all candidate channel access parameters to screen out candidate channel access parameters, under which the state of the channel is judged as idle, as final channel access parameters; and
determine a transmitting power level corresponding the channel according to the final channel access parameters.

8. The apparatus according to claim 7, wherein a corresponding relation between transmitting power levels and channel access parameters comprises that:
a transmitting power is divided into N transmitting power levels;
the channel access parameter corresponding to a level at which transmitting power exceeds a threshold comprises: a parameter indicating a fixed CCA threshold; and
the channel access parameter corresponding to a level at which transmitting power does not exceed the threshold comprises the following parameters: a receiving power upper limit of a radio frame transmitted by an access point corresponding to the transmitting power level, a CCA threshold margin corresponding to the transmitting power level, and a CCA threshold lower limit corresponding to the transmitting power level.

9. The apparatus according to claim 7, wherein,
the measurement module is configured to measure a plurality of channels before data are transmitted;
the CCA threshold determination module is configured to, for each channel, determine a CCA threshold corresponding to the channel according to a corresponding relation among a channel measurement result, transmitting power levels and channel access parameters, and judge whether the state of the channel is idle according to the CCA threshold; and
the apparatus further comprises:
a power allocation module configured to, after the CCA threshold corresponding to each channel is determined, determine transmitting powers over channels.

* * * * *